US009566509B2

(12) United States Patent
Paquet et al.

(10) Patent No.: US 9,566,509 B2
(45) Date of Patent: Feb. 14, 2017

(54) ADAPTIVE RENDERED ENVIRONMENTS USING USER CONTEXT

(71) Applicant: Disney Enterprises, Inc., Burbank, CA (US)

(72) Inventors: Philippe Paquet, Beverly Hills, CA (US); Steven Makofsky, Sammamish, WA (US)

(73) Assignee: Disney Enterprises, Inc., Burbank, CA (US)

( * ) Notice: Subject to any disclaimer, the term of this patent is extended or adjusted under 35 U.S.C. 154(b) by 96 days.

(21) Appl. No.: 13/797,057

(22) Filed: Mar. 12, 2013

(65) Prior Publication Data

US 2014/0267221 A1 Sep. 18, 2014

(51) Int. Cl.
*G09G 5/00* (2006.01)
*A63F 13/216* (2014.01)
*G06T 19/00* (2011.01)
*A63F 13/213* (2014.01)
*A63F 13/42* (2014.01)
*A63F 13/55* (2014.01)

(52) U.S. Cl.
CPC .......... *A63F 13/216* (2014.09); *A63F 13/213* (2014.09); *A63F 13/42* (2014.09); *A63F 13/55* (2014.09); *G06T 19/00* (2013.01)

(58) Field of Classification Search
USPC ....................................................... 345/633
See application file for complete search history.

(56) References Cited

U.S. PATENT DOCUMENTS

| 6,396,509 | B1* | 5/2002 | Cheng ................... G06F 3/011 345/419 |
| 7,073,129 | B1* | 7/2006 | Robarts et al. ............... 715/740 |
| 8,766,763 | B2* | 7/2014 | Takeuchi ...................... 340/3.1 |
| 2002/0044152 | A1* | 4/2002 | Abbott et al. ................. 345/629 |
| 2005/0123171 | A1* | 6/2005 | Kobayashi et al. .......... 382/103 |
| 2008/0074424 | A1* | 3/2008 | Carignano .................... 345/473 |
| 2010/0257252 | A1* | 10/2010 | Dougherty et al. .......... 709/217 |
| 2010/0287485 | A1* | 11/2010 | Bertolami et al. ............ 715/764 |
| 2011/0242134 | A1* | 10/2011 | Miller et al. .................. 345/633 |
| 2013/0286236 | A1* | 10/2013 | Mankowski ............... 348/222.1 |
| 2015/0169119 | A1* | 6/2015 | Kornmann .......... G06F 3/04815 345/173 |

* cited by examiner

*Primary Examiner* — M Good Johnson
(74) *Attorney, Agent, or Firm* — Farjami & Farjami LLP

(57) ABSTRACT

There is provided a system and method for adaptive rendered environments using user context. The method comprises determining user context data corresponding to a user of a virtual environment, altering a feature of the virtual environment using the user context data to obtain an altered feature, and rendering the altered feature of the virtual environment for display. The feature may include a non-player character in the virtual environment, such as eyesight focus of the non-player character or a physical action of the non-player character. The user context data may correspond to real world position data of a user and may be determined using a camera, for example through image recognition, or using a user device. Additionally, the virtual environment may include a cinematic, interactive game, or user generated content.

20 Claims, 5 Drawing Sheets

ADAPTIVE RENDERED ENVIRONMENTS USING USER CONTEXT

BACKGROUND

Digitally created environments can provide immersive environments where real world players may feel deeply engrossed with an ongoing storyline. Using realistic renderings and captivating stories, players can feel as if they are actually part of the narrative. Additionally, as games, cinematic sequences, and other media content become more sophisticated, players may use creatively designed avatars, sometimes featuring their own likeness. This leads to a personal attachment to the game that helps create an emotional link between the player and the media content. However, as media content is not actually aware of the user context, such as positions, light levels, or other context information, often rendered environments feel fake or artificial. Thus, certain actions taken by non-player characters in the media content may look comical or out of place.

Media devices used for presenting media content usually contain a broad array of sensors and attached controllers. Video game consoles may include wireless controllers, infrared ports to connect user devices, and other external controllers. Additionally, it is increasingly common to equip both televisions and media devices with cameras. Thus, both media device and attached user devices come equipped with sensors to detect transmit, store, and/or utilize data corresponding to a user context. Therefore, these devices may be used to determine and provide real world player information.

SUMMARY

The present disclosure is directed to adaptive rendered environments using user context, substantially as shown in and/or described in connection with at least one of the figures, as set forth more completely in the claims.

DETAILED DESCRIPTION

Figure 1A:
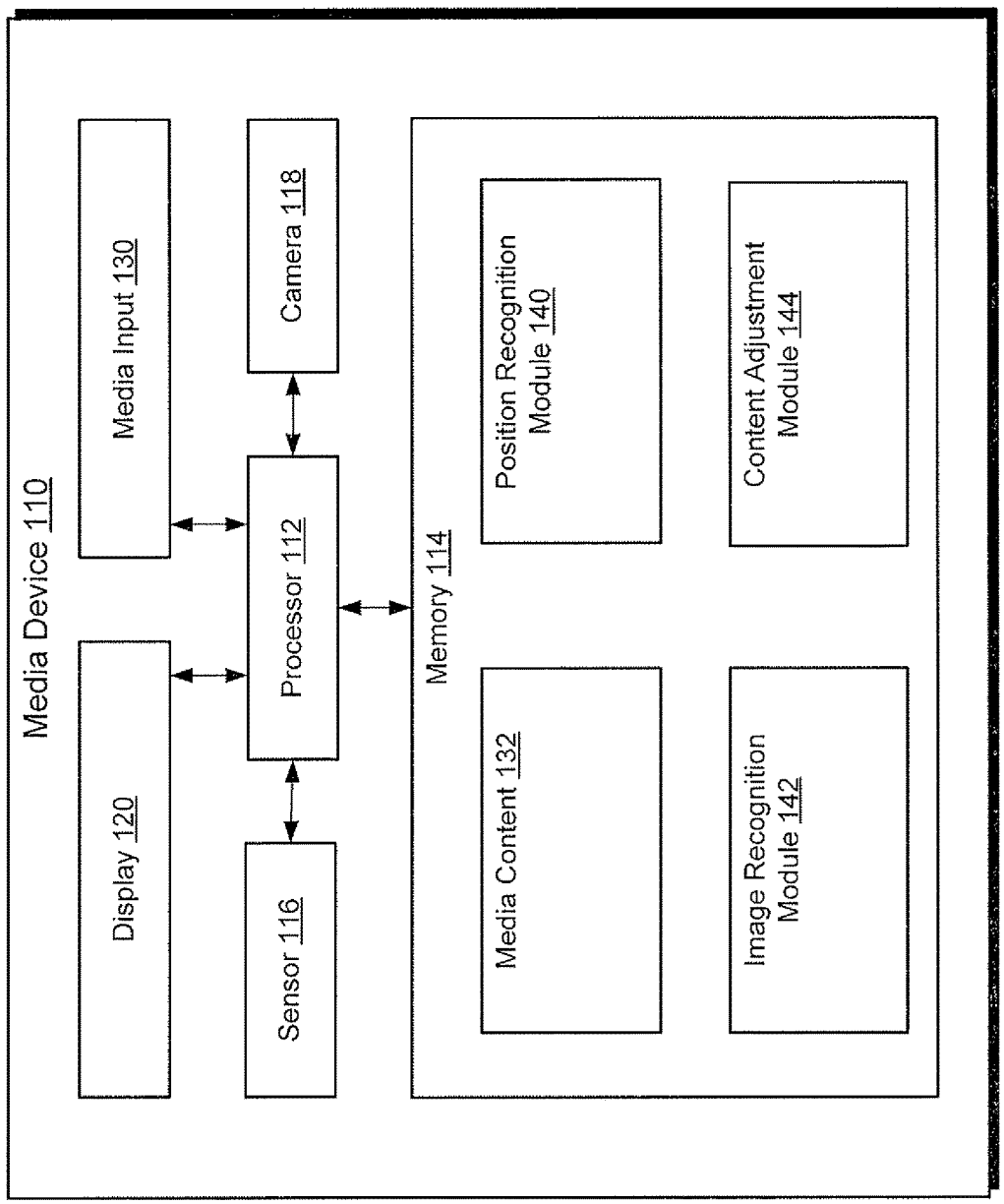
FIG. 1A presents an exemplary media device for adaptive rendered environments using user context.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary media device for adaptive rendered environments using user context. According to FIG. 1A, media device 110 includes processor 112, memory 114, sensor 116, camera 118, display 120 and media input 130. Additionally, memory 114 of media device 110 is shown containing media content 132, position recognition module 140, image recognition module 142, and content adjustment module 144. Media device 110 may correspond to a media device, such as a video game console, interactive smart television, personal computer, mobile phone, personal digital assistant, or other device.

As shown in FIG. 1A, media device 110 includes processor 112 in connection with memory 114. Processor 112 of media device 110 is configured to access memory 114 to store received input and/or to execute commands, processes, or programs stored in memory 114. Processor 112 may receive media content, such as interactive video games, cinematic sequences, user generated content, and other media content, from media input 130. Media input 130 is shown residing on media device 110 and may refer generally to media content input received through an input means, such as a CD/DVD/Blu-Ray player, USB port, storage device, or other form of media content input. However, in other implementations, media input 130 may include network communication connections, such as a wireless, radio, Ethernet, or other network communication. Thus, media input 130 may include media content received over a network communication. Processor 112 may store media input 130 in memory 114 as media content 132. Media content 132 may correspond to media content downloaded for persistent storage in memory 214 from media input 130. However, in other implementations, media content 132 may correspond to data retrieved from other input means, such as read from a CD/DVD/Blu-Ray disk during use. Thus, media input 130 may correspond to data received from attached devices and/or networks.

Processor 112 may also access memory 114 and execute programs, processes, and modules stored in memory 114, such as position recognition module 140, image recognition module 142, and/or content adjustment module 144. Additionally, processor 112 may store in memory 114 data resulting from executed programs, processes and modules. Processor 112 may correspond to a processing device, such as a microprocessor or similar hardware processing device, or a plurality of hardware devices. However, in other implementations, processor 112 refers to a general processor capable of performing the functions required by media device 110.

Memory 114 of media device 110 corresponds to a sufficient memory capable of storing commands, processes, and programs for execution by processor 112. Memory 114 may be instituted as ROM, RAM, flash memory, or any sufficient memory capable of storing a set of commands. In other implementations, memory 114 may correspond to a plurality memory types or modules. Thus, processor 112 and memory 114 contains sufficient memory and processing units necessary for media device 110. Although memory 114 is shown as located on media device 110, in other implementations, memory 114 may be separate but connectable to media device 110.

Processor 112 of media device 110 is further in contact with sensor 116. Sensor 116 may include an optical sensor, such as an infrared (IR) sensor, or similar. Sensor 116 may also correspond to another sensor capable of communicating with a wired or wireless connected to a controller or user device, such as radio, wireless, wired, Bluetooth, or other communication sensor. Sensor 116 may be utilized to communicate with a connectable user device, such as a video game controller, remote controller, mobile phone, tablet or laptop computer, or other user device. Thus, sensor 116 may receive user context data from a connectable user device. Sensor 116 may further be configured to determine user context data, such as a location of the connectable user device. Thus, sensor 116 may receive data corresponding to user context from the connectable user device, or sensor 116 may detect the user context data of the connectable user device, such as through proximity awareness. Although in the implementation of FIG. 1A sensor 116 is shown located on media device 110, in other implementations sensor 116 may be separate but connectable to media device 110.

Processor 112 of media device 110 is also connected to camera 118. Camera 118 may include a connected device capable of recording still and/or video images. Thus, camera 118 may correspond to a digital camera for photographs and/or videos. Camera 118 may further include additional features, such as lens focus, flash lighting, exposure and/or shutter speeds, or other desirable features. Although in the implementation of FIG. 1A camera 118 is shown located on media device 110, in other implementations camera 118 may be separate but connectable to media device 110.

Display 120 is connected to processor 112 of media device 110 for rendering and output of media content 132. Display 120 may correspond to a visual display unit capable of presenting and rendering media content for a user. Display 120 may correspond to a liquid crystal display, plasma display panel, cathode ray tube, or other display. Processor 112 is configured to access display 120 in order to render content for viewing by the user. While FIG. 1A shows display 120 as part of media device 110, in other implementations, display 120 may be external to media device 110 or separate and connectable to media device 110. Thus, in certain implementations, such as when media device 110 is a television receiver, display 120 may be separate and connectable to media device 110. Additionally, display 120 may correspond to one visual display unit or a plurality of visual display unit.

Memory 114 of media device 110 is shown containing media content 132, position recognition module 140, image recognition module 142, and content adjustment module 144. As previously discussed, media content 132 may correspond to audio, visual, or audiovisual content, such as movies, cinematic sequences, interactive games, and/or user generated content. Media content 132 may correspond to media content obtained from media input 130, such as a network connection, CD/DVD/Blu-Ray disk drive, or connected memory unit. Media content 132 contains specific instances of content where a feature, such as a non-player character in the virtual environment of the media content, interacts with a user of media device 110. For example, the user of media device 110 may be experiencing media content 132 in a first person view. Thus, the non-player character in the virtual environment may look at the user, or may point at the user. However, without knowing a real world location of the user, the non-player character may look or point generally to an area directly in front of display 120 or a scene center point. Thus, if the user is located elsewhere, the user may feel the experience is artificial.

Memory 114 further includes position recognition module 140. Position recognition module 140 corresponds generally to processes or procedures utilized to determine a real world position data of a user of media device 110 using sensor 116, camera 118, and/or connected user devices. Position recognition module 140 may include proximity awareness processes to determine the location of the user to media device 110. Position recognition module 140 may also query the connected user devices to receive information corresponding to the real world position data of the user of media device 110. For example, in one implementation, position recognition module 140 may use sensor 116 to determine the real-world position of the user through infrared, or similar, proximity awareness. However, in another implementation, position recognition module 140 may utilize camera 118 as a proximity sensor, or may request information, such as a GPS position, of the connected user devices. Thus, position recognition module 140 may determine a real world position data of the user of media device 110.

Image recognition module 142 is stored in memory 114 of media device 110. Image recognition module 142 may correspond generally to processes and procedures utilized to recognize image data from captured or stored images. Image recognition module 142 may be utilized with camera 118 to process images captured by camera 118. For example, utilizing camera 118, image recognition module 142 may utilize face perception technology or other image recognition techniques to determine data corresponding to user context of a user of media device 110. Image recognition module 142 may further determine eye level of the user and/or facial features of the user.

Utilizing user context data determined through sensor 116 and/or camera 118, content adjustment module 144 may then be used with media content 132 to provide an altered feature of media content 132. Utilizing a feature of media content 132, such as eye contact of a non-player character in a virtual environment, content adjustment module 144 may adjust the feature according to the received user context data. The data may be used to cause the non-player character to make eye contact with the user of media device 110, or to point at or otherwise engage with the user. Thus, the user may feel an increased realism and emotional connection with media content 132.

Figure 1B:
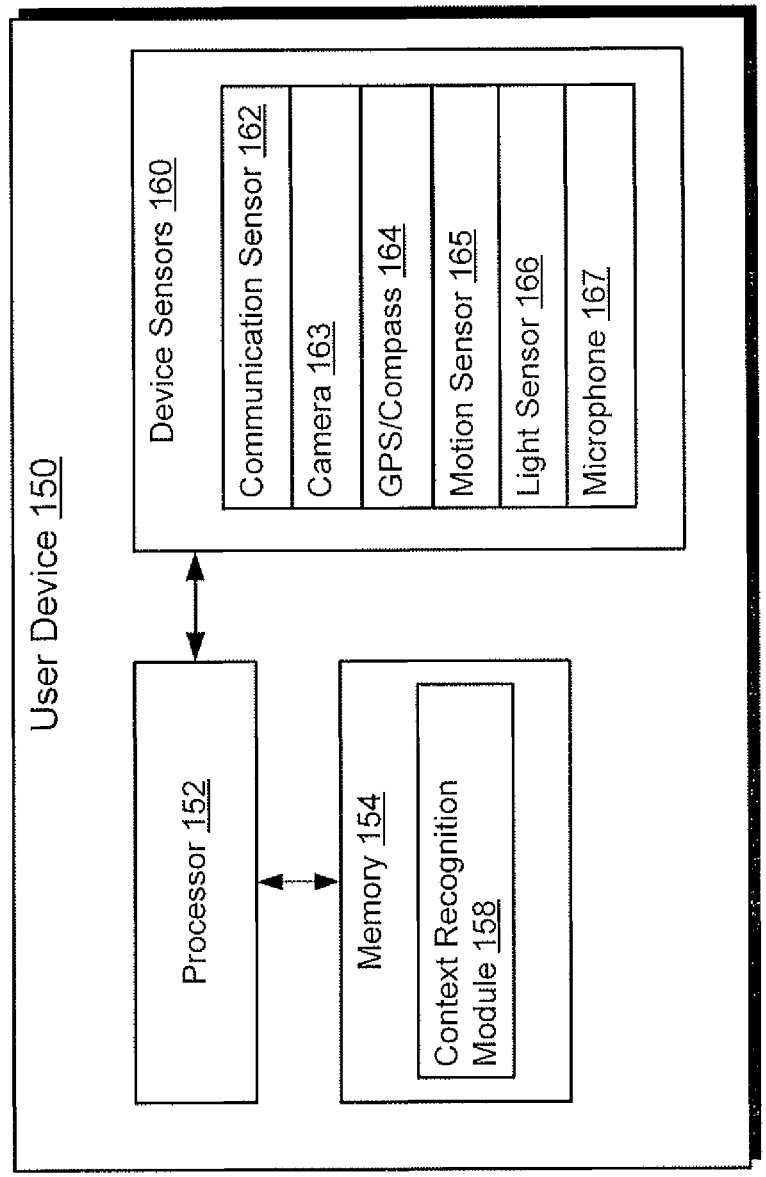
FIG. 1B presents an exemplary user device for determining and transmitting data for adaptive environments using user context.

Moving to FIG. 1B, FIG. 1B presents an exemplary user device for determining and transmitting data for adaptive environments using user context. User device 150 of FIG. 1B is shown with processor 152, memory 154, and device sensors 160. Memory 155 of user device 150 contains context detection module 156. Additionally, device sensors 160 include communication sensor 162, camera 163, GPS/compass 164, motion sensor 165, light sensor 166, and microphone 167. Although device sensors 160 contain communication sensor 162, camera 163, GPS/compass 164, motion sensor 165, light sensor 166, and microphone 167, device sensors 160 are shown by way of example. Thus, more, less, or other device sensors may be included on user device 150 as necessary.

Processor 152 and memory 154 of user device 150 may correspond in general to processor 112 and memory 114, respectively, of media device 110 from FIG. 1A. Thus, processor 152 and memory 154 may share similar functions and implementations as those described above in reference to processor 112 and memory 114, respectively. User device 150 is in communication with media device 110 such as using a direct communication link, infrared transmitter, wireless connection, or other communication connections. Thus, user device 150 transmits and receives data from media device 110.

Memory 154 of user device 150 is shown with context detection module 156. Context detection module 156 corresponds generally to processes or procedures utilized to determine a user context data corresponding to a user of user device 150 using device sensors 160. In certain implementations, context detection module 156 may include proximity awareness processes to determine the location of the user using device sensors 160, for example GPS/compass 164. Context detection module 156 may also be configured to detect ambient light levels, sounds and/or voice data, image and/or visual data, or other user context data corresponding to a user of user device 150. Thus, context detection module 156 may determine user context corresponding to a user of user device 150.

User device 150 of FIG. 1B contains device sensors 160 connected to processor 152. As previously discussed, device sensors 160 may include sensors capable of detecting user context data corresponding to a user of user device 150 and transmitting the data to a media device for adaptive rendered environments. As shown in FIG. 1B, device sensors 160 include communication sensor 162, camera 163, GPS/compass 164, motion sensor 165, light sensor 166, and microphone 167. Communication sensor 162 may be a sensor capable of detecting, receiving, and transmitting data. For example, communication sensor 162 may incorporate a short-range wireless communications link, such as infrared, radio, Bluetooth, or other communication link. Thus, communication sensor 162 may be any suitable means for transmitting, receiving, and interpreting data. Camera 163 may include a photographing unit capable of capturing and/or saving photographs. Similar to camera 118 of FIG. 1A, camera 163 may correspond to a digital camera for photographs and/or videos.

GPS/compass 164 may correspond to a global positioning unit, assisted global positioning unit, compass sensor, or similar unit capable of determining a location and/or movement of a user. Motion sensor 165 may correspond to a sensor unit capable of detecting movements and/or motions of device 150, such as an accelerometer, gyroscope, inclinometer, or gravity-detecting sensor. Light sensor 166 may include a sensor capable of determining ambient light levels of user device 150, such as ambient light levels of a room corresponding to user device 150. Microphone 167 may correspond to a general audio detecting sensor, such as an acoustic to electric sensor utilized in mobile phones to receive audio communications.

While device sensors 160 of FIG. 1B include sensors 162-167, in other implementations, device sensors 160 may be configured differently, having more, less, or different sensors. For example, device sensors 160 may include a thermometer, barometer, or other sensors. Device sensors 160 may correspond to sensors embedded in user device 150 or sensors connectable to user device 150. For example, user device 150 may contain microphone 167 attachable to user device 150, such as through an audio connection or communication sensor 162. Thus, user device 160 may receive data from sensors external and connectable to user device 150.

As previously discussed, context recognition module 158 may include processes and procedures for use with device sensors 160 to detect user context data corresponding to a user of user device 150. Once user device 160 has detected user context data, such as position, ambient light level, or other context data corresponding to a user of user device 150, user device 150 may transmit the information to a media device. The media may utilize the user context data to add user context to an adaptive rendered environment.

Figure 2B:
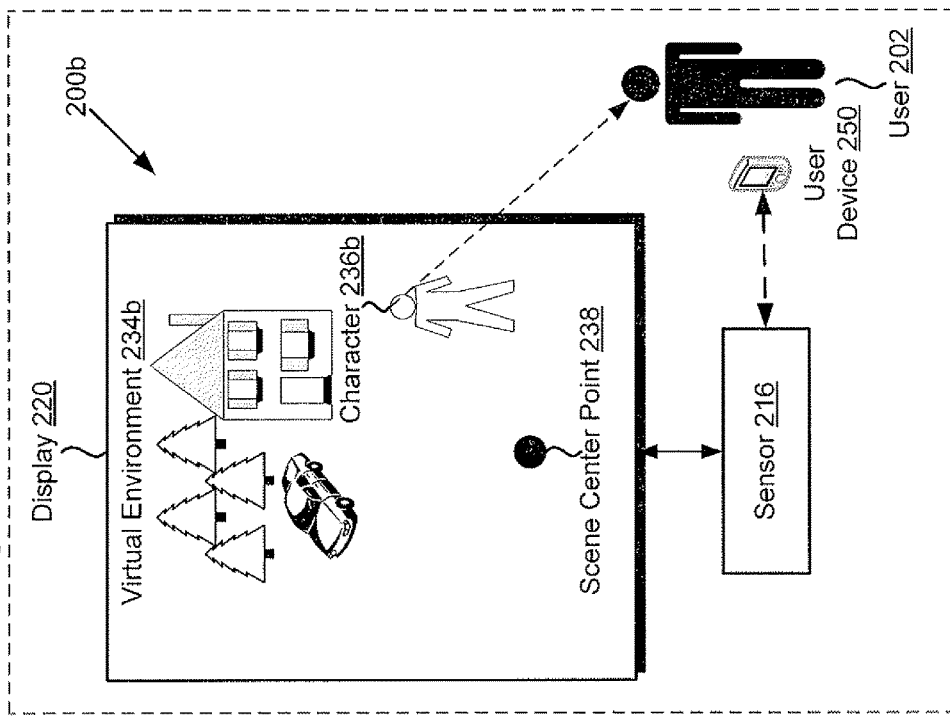
FIG. 2B shows a rendered environment adjusted using user context received from a user device.
Figure 2A:
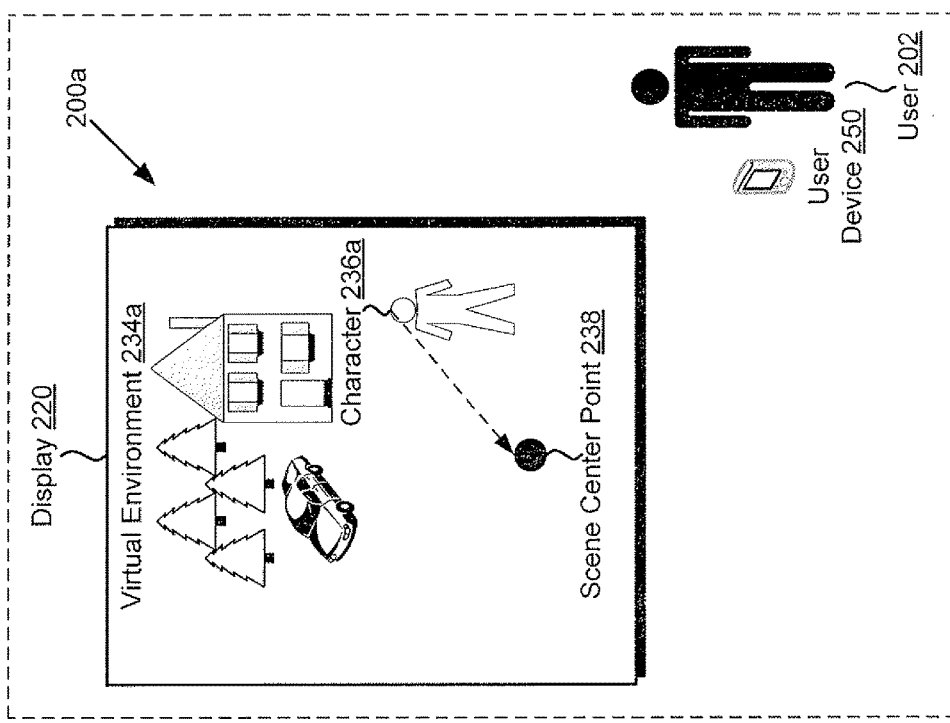
FIG. 2A shows an exemplary rendered environment prior to adjustment using user context.

As shown in FIG. 2A, FIG. 2A shows an exemplary rendered environment prior to adjustment using user context. FIG. 2A shows environment 200*a* with user 202 possessing user device 250 and viewing display 220. Display 220 is shown with virtual environment 234*a* having character 236*a* and scene center point 238. FIG. 2A is shown for conceptual clarity and it is understood that display 220 may be further connected to a device, such as media device 110 of FIG. 1A, for the receiving of data and rendering of virtual environment 234*a*.

User 202 may possess user device 250, such as a connectable video game controller, remote controller, mobile phone, tablet or laptop computer, or other user device. User 202 may utilize user device 250 with a device for playback of media content on display 220. User device 250 may include controls usable with the media content, for example controlling a character or avatar in a first person or third person view in the media content. However, in other implementations, user device 250 may also be utilized to control playback of the media content, such as a movie, cinematic, or other audiovisual content. User device 250 may further include a transmission unit for transmitting controls to the device playing the media content, such as infrared, Bluetooth, wireless, or other radio transmission means.

A device utilized for playback of media content may include display 220 rendering virtual environment 234*a* of the media content. As previously discussed, display 220 may correspond to a visual display unit capable of presenting and rendering media content for user 202. Display 220 may correspond to a liquid crystal display, plasma display panel, cathode ray tube, or other display unit. Virtual environment 234*a* may correspond to a rendered scene from the media content, such as a cinematic or video game environment. Virtual environment 234*a* may show a predetermined scene or may correspond to a video game environment that user 202 may interact with through a character or avatar.

FIG. 2A represents virtual environment 234*a* as viewed through a first person perspective according to user 202. Thus, virtual environment 234*a* may be viewed through a first person perspective of some character or avatar while experiencing virtual environment 234*a*. As shown in FIG. 2A, virtual environment 234*a* includes character 236*a*. Character 236*a* may correspond to a non-player character during a cinematic or video game experience.

Character 236*a* of FIG. 2A is shown interacting with user 202 by looking at a predetermined scene point represented by scene center point 238. As previously discussed, without adjusting character 236*a* according to user context of user 202, character 236*a* is looking, speaking, pointing at, or otherwise interacting with scene center point 238 and not user 202. Thus, according to the perspective of user 202, character 236*a* appears to be interacting with a different point than user 202, and thus appears fake or otherwise artificial. Thus, user 202 may not feel an emotional connection with character 236*a* and/or virtual environment 234*a*.

Moving to FIG. 2B, FIG. 2B shows a rendered environment adjusted using user context received from a user device. FIG. 2B shows environment 200*b* with user 202 possessing user device 250 and viewing display 220. Display 220 is shown with virtual environment 234*b* having character 236*b* and scene center point 238. In contrast to FIG. 2A, environment 200*b* of FIG. 2B shows sensor 216 determining user context data from user device 250 for use in virtual environment 234*b*. FIG. 2B is shown for conceptual clarity and it is understood that display 220 may be further connected to a device, such as media device 110 of FIG. 1A, for the receiving of data and rendering of virtual environment 234*b*

FIG. 2B shows display 220 rendering virtual environment 234*b* altered to include user context data of user 202. User 202, user device 250, and display 220 of FIG. 2B may correspond generally to user 202, user device 250, and display 220 of FIG. 2A. As previously discussed, sensor 216 may correspond to a sensor usable with a position recognition module to determine user context data of user 202 using user device 250. For example, sensor 216 may include an optical sensor, such as an infrared (IR) sensor, or similar. Sensor 216 may also correspond to another sensor capable of communicating with a wired or wireless connected to a controller or user device, such as radio, wireless, wired, Bluetooth, or other communication sensor. Sensor 216 may receive and request data corresponding to the user context of user 202 from user device 250. For example, sensor 216 may utilize proximity awareness using an optical sensor. However, sensor 216 may also request the user context from user device 250, such as a GPS coordinate or position, ambient light level, audio, or other user context.

Utilizing the received user context data corresponding to a user context of user 202, virtual environment 234b may be rendered presenting an altered feature based on the user context data. Virtual environment 234b shows character 236b and scene center point 238. Scene center point 238 may correspond generally to scene center point 238 of FIG. 2A. However, as shown in FIG. 2B, character 236b is shown interacting with user 202 instead of scene center point 238. Using the user context, character 234b may look, speak, point at, or otherwise interact directly with user 202. Thus, virtual environment 234b presenting an altered virtual environment using user context data, user 202 may feel a deeper emotional connection with virtual environment 234b.

Media content containing virtual environment 234b may also be configured to change the features, such as character 236b, based on the changing viewpoint of virtual environment 234b. For example, a character or avatar corresponding to user 202 in virtual environment 234b may present virtual environment 234b for rendering on display 220 using a first person view. However, user 202 may wish to change the rendered viewpoint to a third person viewpoint and thus view the character or avatar. Based on a change to a third person viewpoint, virtual environment 234b may then further change character 236b to interact directly with the character or avatar and no longer use the user context data. This may create a more seamless and realistic experience.

Although FIG. 2B shows virtual environment 234b presenting an altered feature based on the real world position of user 202, other implementations may utilize other user context as a basis to adjust and adapt the rendered virtual environment. For example, user device 250 may transmit user context data corresponding to ambient light levels in or around user 202, audio levels or recorded audio data corresponding to user 202, image data corresponding to user 202, or other user context data. Thus, FIG. 2B is presented by way of example and it is understood different user context data may be utilized to present an altered feature in a rendered virtual environment.

Figure 3A:
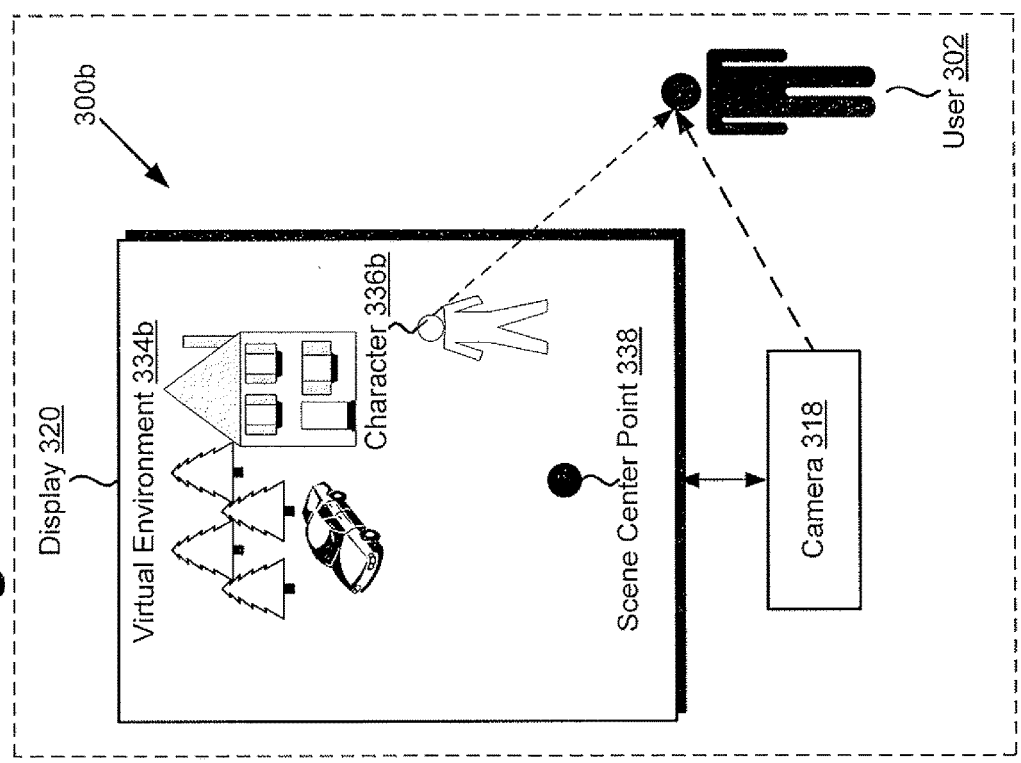
FIG. 3A presents an exemplary rendered environment prior to adjustment using user context.

FIG. 3A presents an exemplary rendered environment prior to adjustment using user context. FIG. 3A shows environment 300a with user 302 viewing display 320. Display 320 is shown with virtual environment 334a having character 336a and scene center point 338. FIG. 3A is shown for conceptual clarity and it is understood that display 320 may be further connected to a device, such as media device 110 of FIG. 1A, for the receiving of data and rendering of virtual environment 334a.

User 302 of FIG. 3A is shown display 320. As previously discussed, display 320 may correspond to a visual display unit capable of presenting and rendering media content for user 302. Display 320 may correspond to a liquid crystal display, plasma display panel, cathode ray tube, or other display unit. User 302 may be viewing media content, such as a movie, television show, video game, user-generated content, or other visual or audiovisual content on display 320. The media content may include interactive environment 334a having character 336a and scene center point 338. Thus, virtual environment 334a may correspond to a rendered scene from the media content, such as a cinematic or video game environment.

Similar to FIG. 2A, FIG. 3A represents virtual environment 334a as viewed through a first person perspective according to user 302. Thus, virtual environment 334a may be viewed through a first person perspective of some character or avatar while experiencing virtual environment 334a. Character 336a may correspond to a non-player character during a cinematic or video game experience. Again similar to FIG. 2A, character 336a of FIG. 3A is shown interacting with user 302 by looking at a predetermined scene point represented by scene center point 338. As previously discussed, without adjusting character 336a according to user context of user 302, character 336a is looking, speaking, pointing at, or otherwise interacting with scene center point 338 and not user 302. According to the perspective of user 302, character 336a appears to be interacting with a different point than user 302, and thus appears fake or otherwise artificial.

Although not shown in FIG. 3A, user 302 may utilize a user device with interactive environment 334a, such as controller, remote controller, mobile phone, tablet or laptop computer, or other user device. User 302 may also utilize the user device with a device for playback of media content on display 320. The user device may include controls usable with the media content, for example controlling a character or avatar in a first person or third person view in the media content. However, in other implementations, the user device may also be utilized to control playback of the media content, such as a movie, cinematic, or other audiovisual content. The user device may further include a transmission unit for transmitting controls to the device, such as infrared, Bluetooth, wireless, or other radio transmission means.

Figure 3B:
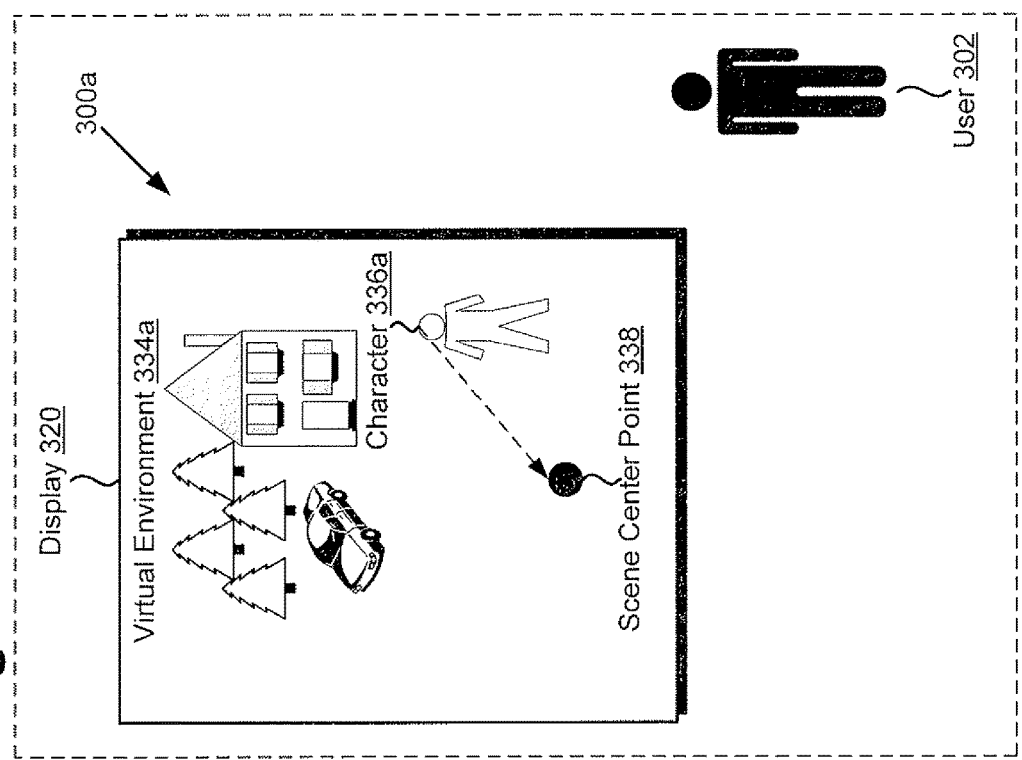
FIG. 3B presents a rendered environment adjusted using user context received from a device camera.

Moving to FIG. 3B, FIG. 3B presents a rendered environment adjusted using user context received from a device camera. FIG. 3B shows environment 300b with user 302 viewing display 320. Display 320 is shown with virtual environment 334b having character 336b and scene center point 338. In contrast to FIG. 3A, environment 300b of FIG. 3B shows camera 318 collecting user context data for use in virtual environment 334b. FIG. 3B is shown for conceptual clarity and it is understood that display 320 may be further connected to a device, such as media device 110 of FIG. 1A, for the receiving of data and rendering of virtual environment 334b FIG. 3B shows display 320 rendering virtual environment 334b altered to include user context of user 302. User 302 and display 320 of FIG. 3B may correspond generally to user 302 and display 320 of FIG. 3A. As previously discussed, camera 318 may include a connected device capable of recording still and/or video images. Thus, camera 318 may correspond to a digital camera for photographs and/or videos. Camera 318 may further include additional features, such as lens focus, flash lighting, exposure and/or shutter speeds, or other desirable features. Camera 318 may be utilized with an image recognition module to determine user context data of user 302. However, in other implementations, camera 318 may be utilized with proximity or motion awareness processes to determine the user context data of user 302. Additionally, camera 318 may be utilized to determine additional features of user 302 for more precise location data corresponding to user 302. For example, camera 318 may be utilized with facial recognition technology to determine other user context data corresponding to user 302.

Utilizing the received user context data of user 302, virtual environment 334b may be rendered presenting an altered feature based on the user context data. Virtual environment 334b shows character 336b and scene center point 338. Scene center point 338 may correspond generally to scene center point 338 of FIG. 3A. However, as shown in FIG. 3B, character 336b is shown interacting with user 302 instead of scene center point 338. Using the user context data, character 334b may look, speak, point at, or otherwise interact directly with user 302. Thus, virtual environment 334b presenting an altered virtual environment using user context data, user 302 may feel a deeper emotional connection with virtual environment 334b.

Although FIG. 3B shows virtual environment 334b presenting an altered feature based on the real world position of user 302, other implementations may utilize other user context as a basis to adjust and adapt the rendered virtual environment. For example, camera 318 may determine user context data corresponding to ambient light levels in or around user 302, image data corresponding to user 302, or other user context data. Thus, FIG. 3B is presented by way of example and it is understood different user context data may be utilized to present an altered feature in a rendered virtual environment.

FIGS. 1A, 1B, 2A, 2B, 3A, and 3B will now be further described by reference to FIG. 4, which presents flowchart 400 illustrating a method for adaptive rendered environments using user context. With respect to the method outlined in FIG. 4, it is noted that certain details and features have been left out of flowchart 400 in order not to obscure the discussion of the inventive features in the present application.

Figure 4:
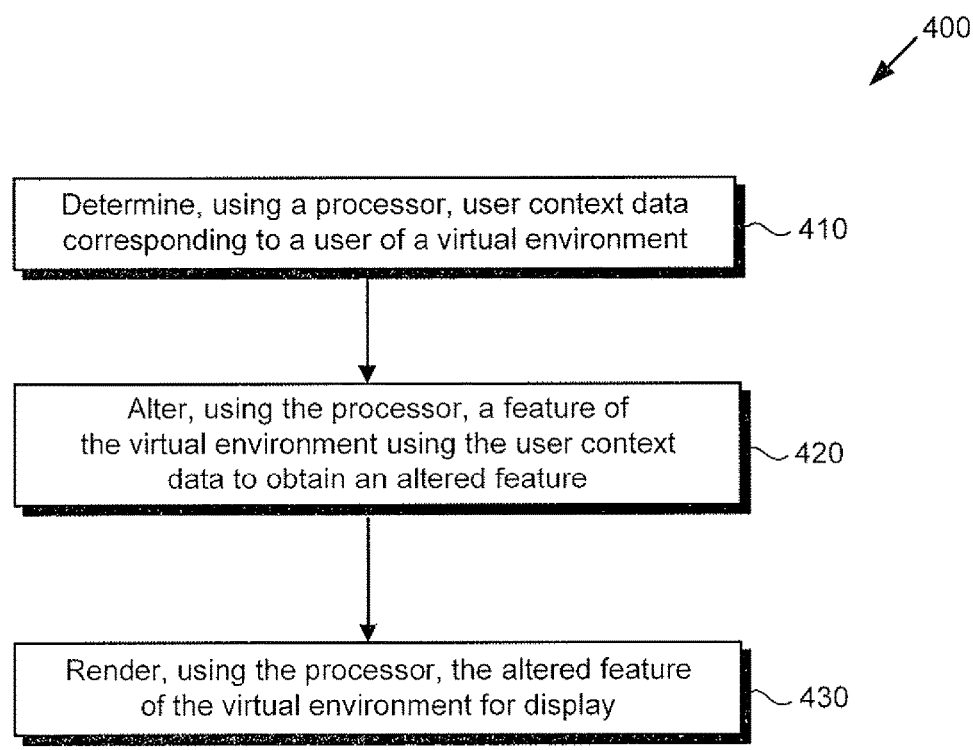
FIG. 4 presents an exemplary flowchart illustrating a method for adaptive rendered environments using user context.

Referring to FIG. 4 in combination with FIG. 1A, FIG. 2A, FIG. 2B, FIG. 3A, and FIG. 3B, flowchart 400 begins with determining, using a processor 112, user context data corresponding to a user 202/302 of a virtual environment 234a/234b/334a/334b (410). Processor 112 of media device 110 may perform the determining. Processor 112 may utilize sensor 116/216 and/or camera 118/318 to determine the user context data of user 202/302, for example, by requesting user context data from user device 150/250. User device 150/250 may utilize device sensors 160 to determine user context corresponding to user 202/302. Processor 112 may also utilize position recognition module 140 with sensor 116/216 to determine user context data, such as by utilizing proximity awareness processes. In other implementations, processor 112 may utilize image recognition module 142 with camera 118/318 to determine the user context data of user 202/302, such as through image and/or facial recognition processes. Virtual environment 234a/234b/334a/334b may correspond to a scene or environment of media content 132 received from media input 130.

Flowchart 400 continues with altering, using the processor 112, a feature of the virtual environment 234a/234b/334a/334b using the user context data to obtain an altered feature (420). Processor 112 of media device 110 may perform the altering. Processor 112 may utilize content adjustment module 144 with user context data determined using sensor 116/216 and/or camera 118/318. Processor 112 may utilize the user context data with a feature of virtual environment 234a/334a, such as character 236a/336a. Using the user context data with content adjustment module 144, processor 112 may produce an altered feature of virtual environment 234b/334b, for example character 236b/336b. For example, as shown in FIG. 2B and FIG. 3B, character 236b/336b now interacts with a real world position of user 202/302.

The method of flowchart 400 continues with rendering, using the processor 112, the altered feature of the virtual environment 234a/234b/334a/334b for display 120/220/320 (430). Processor 112 of media device 110 may perform the rendering for display 120/220/320. The altered feature may correspond to character 236b/336b after changing character's 236a/336a interaction from scene center point 238/338 to user 202/302. Thus, virtual environment 236b/336b may be rendered for display 120/220/320 with character 236b/336b corresponding to the altered feature.

User context data of players may thus be used to provide a more dynamic and immersive experience with media content. Users may be encouraged to interact with the media content and gain additional emotional involvement with the virtual world. This may increase users interest and excitement with characters in the virtual environment.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor and capable of connecting to a display, the method comprising:
   determining, using the processor, a viewing perspective of a user and user context data including an ambient light level, the user context data corresponding to a real-world position of the user of a virtual environment relative to the display, wherein the viewing perspective of the user switches between a first person view and a third person view;
   altering, using the processor when the viewing perspective of the user is the first person view, a first feature of the virtual environment using the viewing perspective of the user and the user context data including the ambient light level to obtain a first altered feature;
   altering, using the processor when the viewing perspective of the user is the third person view, a second feature of the virtual environment using the viewing perspective of the user but not using the user context data to obtain a second altered feature; and
   rendering, using the processor, one of the first altered feature and the second altered feature of the virtual environment on the display.

2. The method of claim 1, wherein the one of the first feature and the second feature includes a non-player character in the virtual environment.

3. The method of claim 2, wherein the one of the first feature and the second feature includes one of an eyesight focus of the non-player character in the virtual environment and a physical action of the non-player character in the virtual environment.

4. The method of claim 1, wherein the system further includes a media device, wherein the media device includes the processor, and wherein the display is separate from the media device.

5. The method of claim 1, wherein the determining the user context data uses a camera.

6. The method of claim 5, wherein the determining the user context data using a camera further includes using image recognition.

7. The method of claim 1, wherein the determining the user context data uses a user device.

8. The method of claim 1, wherein the virtual environment includes one of a cinematic sequence, interactive game, and user generated content.

9. A system for use with a display, the system comprising:
a processor configured to:
   determine a viewing perspective of a user and user context data including an ambient light level, the user context data corresponding to a real-world position of the user of a virtual environment relative to the display, wherein the viewing perspective of the user switches between a first person view and a third person view;
   alter, when the viewing perspective of the user is the first person view, a first feature of the virtual environment using the viewing perspective of the user and the user context data including the ambient light level to obtain a first altered feature;
   alter, when the viewing perspective of the user is the third person view, a second feature of the virtual environment using the viewing perspective of the user but not using the user context data to obtain a second altered feature; and
   render one of the first altered feature and the second altered feature of the virtual environment on the display.

10. The system of claim 9, wherein the one of the first feature and the second feature includes a non-player character in the virtual environment.

11. The system of claim 10, wherein the one of the first feature and the second feature includes one of an eyesight focus of the non-player character in the virtual environment and a physical action of the non-player character in the virtual environment.

12. The system of claim 9, further comprising:
a media device including the processor;
wherein the display is separate from the media device.

13. The system of claim 9 further comprising:
a camera;
wherein the processor determines the user context data using the camera.

14. The system of claim 13, wherein the processor determines the user context data using a camera further includes using image recognition.

15. The system of claim 9 further comprising:
a user device;
wherein the processor determines the user context data using the user device.

16. The system of claim 9, wherein the virtual environment includes one of a cinematic, interactive game, and user generated content.

17. A system for use with a display, the system comprising:
a processor; and
a user device for communication with the processor;
the processor configured to:
   determine a viewing perspective of a user and user context data including an ambient light level, the user context data corresponding to a real-world position of the user of a virtual environment relative to the display, wherein the viewing perspective of the user switches between a first person view and a third person view;
   alter, when the viewing perspective of the user is the first person view, a first feature of the virtual environment using the viewing perspective of the user and the user context data including the ambient light level to obtain a first altered feature;
   alter, when the viewing perspective of the user is the third person view, a second feature of the virtual environment using the viewing perspective of the user but not using the user context data to obtain a second altered feature; and
   render one of the first altered feature and the second altered feature of the virtual environment on the display.

18. The system of claim 17, wherein the user device includes one of a remote controller, a video game controller, and a cellular phone.

19. The system of claim 17, wherein the user device includes an infrared proximity sensor.

20. The system of claim 17, wherein the one of the first feature and the second feature includes a non-player character in the virtual environment.

* * * * *